(12) United States Patent
Siikonen et al.

(10) Patent No.: US 7,913,819 B2
(45) Date of Patent: Mar. 29, 2011

(54) SET OF ELEVATORS AND METHOD FOR CONTROLLING A SET OF ELEVATORS

(75) Inventors: Marja-Liisa Siikonen, Helsinki (FI); Janne Sorsa, Helsinki (FI); Esko Aulanko, Kerava (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 12/457,465

(22) Filed: Jun. 11, 2009

(65) Prior Publication Data

US 2009/0250298 A1 Oct. 8, 2009

Related U.S. Application Data

(60) Division of application No. 11/892,735, filed on Aug. 27, 2007, now Pat. No. 7,559,407, which is a continuation of application No. PCT/FI2006/000079, filed on Mar. 8, 2006.

(30) Foreign Application Priority Data

Mar. 11, 2005 (FI) ..................................... 20050263

(51) Int. Cl.
*B66B 1/18* (2006.01)
(52) U.S. Cl. ...................... 187/382; 187/293; 187/391
(58) Field of Classification Search .................. 187/247, 187/248, 393, 396, 397, 380–388, 391
See application file for complete search history.

(56) References Cited

U.S. PATENT DOCUMENTS

| | | | |
|---|---|---|---|
| 3,506,095 A | | 4/1970 | Weaver |
| 3,750,849 A | | 8/1973 | Berkovitz |
| 4,130,184 A | * | 12/1978 | Satoh et al. ................... 187/295 |
| 4,136,758 A | * | 1/1979 | Tachino ........................ 187/295 |
| 4,751,984 A | * | 6/1988 | Williams et al. .............. 187/295 |
| 4,761,589 A | | 8/1988 | Hauptfleisch et al. |
| 5,241,141 A | * | 8/1993 | Cominelli ..................... 187/295 |
| 5,266,757 A | * | 11/1993 | Krapek et al. ................ 187/295 |
| 5,723,968 A | * | 3/1998 | Sakurai ........................ 318/802 |
| 5,780,786 A | * | 7/1998 | Miyanishi ..................... 187/293 |

(Continued)

FOREIGN PATENT DOCUMENTS

JP 54-013156 A 1/1979

(Continued)

*Primary Examiner* — Jonathan Salata
(74) *Attorney, Agent, or Firm* — Harness, Dickey & Pierce, P.L.C.

(57) ABSTRACT

A set of elevators includes a plurality of elevators without counterweight, a power supply, and a common control system. The plurality of elevators has a common connection to the power supply. The common control system includes one or more instructions to prevent or delay dispatch of an elevator car stopped at a floor if, at that instant, within a set period of time, or at that instant and within the set period of time, power consumed from an associated electrical network by the set of elevators or fed into the associated electrical network by the set of elevators together exceeds a set value. A method for controlling a set of elevators includes determining whether power consumed together exceeds a set value, and when the power consumed exceeds the set value, then departure of a next elevator car to be dispatched is prevented or delayed.

20 Claims, 6 Drawing Sheets

U.S. PATENT DOCUMENTS

| | | |
|---|---|---|
| 5,788,018 A | 8/1998 | Mendelsohn et al. |
| 5,896,948 A * | 4/1999 | Suur-Askola et al. ........ 187/290 |
| 6,315,081 B1 | 11/2001 | Yeo |
| 6,938,733 B2 | 9/2005 | Eilinger |
| 7,264,087 B2 * | 9/2007 | Hawkins ....................... 187/293 |
| 7,540,355 B2 * | 6/2009 | Harkonen ..................... 187/290 |
| 7,575,100 B2 * | 8/2009 | Kugiya et al. ................. 187/305 |
| 2004/0089502 A1 * | 5/2004 | Martini ......................... 187/290 |
| 2008/0185234 A1 | 8/2008 | Harkonen |
| 2008/0283341 A1 | 11/2008 | Aulanko et al. |

FOREIGN PATENT DOCUMENTS

| | | |
|---|---|---|
| JP | 2001-278555 A | 10/2001 |
| WO | WO 2004/041704 A1 | 5/2004 |

* cited by examiner

SET OF ELEVATORS AND METHOD FOR CONTROLLING A SET OF ELEVATORS

CROSS-REFERENCE TO RELATED APPLICATIONS

This application is a divisional application of U.S. patent application Ser. No. 11/892,735 filed Aug. 27, 2007, (now U.S. Pat. No. 7,559,407 B2); which is a continuation of PCT/FI2006/000079, filed on Mar. 8, 2006; which is an international application claiming priority from FI 20050263, filed Mar. 11, 2005; the entire contents of all of which are hereby incorporated by reference.

BACKGROUND

1. Field

The present invention relates to a set of elevators with common control system and to a method for controlling a set of elevators with common control system.

2. Description of Related Art

One of the objectives in elevator development work is to achieve an efficient and economical utilization of building space. When a plurality of elevators are installed in a building, quite often so as to form one or more elevator groups, efficiency of space utilization becomes more important. Elevators without machine room have made it possible to achieve significant space savings in buildings. Likewise, space savings have been achieved in the elevator groups themselves by providing common machine rooms for the elevators in the elevator group to house the machinery of two or more elevators.

By using an elevator construction without counterweight, significant savings of building space are achieved as there is no need to reserve any space in the elevator shaft for the passage of a counterweight. A prior-art solution for a traction sheave elevator without counterweight is disclosed in specification U.S. Pat. No. 5,788,018, in which the elevator car is suspended with a 1:1 suspension ratio and which uses a separate controllable tensioning device for the tensioning of the rope loop. A recent traction sheave elevator solution without counterweight is described in specification WO2004041704, which discloses an elevator in which the motion of the elevator car is based on friction with elevator hoisting ropes driven by a traction sheave. This solution is primarily targeted for low buildings and/or elevators with a low hoisting height. The specification provides solutions that are primarily applicable for use in relatively low buildings, although the ideas are also applicable in the case of larger hoisting heights. Large hoisting heights and higher speeds involve new problems to be solved.

In respect of energy consumption, an elevator without counterweight differs from an elevator provided with a counterweight. Especially in the case of larger hoisting heights, controlling the energy consumption of the elevator is important. The reason is that the movement of the elevator requires a large amount of power, which is dominantly directly dependent on the speed of the elevator. While in an elevator with counterweight the counterweight functions as an energy storage, receiving and delivering the potential energy resulting from the up and down movement of the elevator car on its track, an elevator without counterweight has no such storage of mechanical energy, which leads to a need to design the elevator hoisting machine and the electric drive supplying the hoisting machine for very high power ratings, although the masses to be moved in an elevator without counterweight are smaller than in an elevator with counterweight and thus also the required acceleration power is lower than in an elevator with counterweight. Energy consumption in itself is only one factor to be considered when estimating the suitability of an elevator for a building. Providing a building with several elevators increases the power requirement, which leads to a need for a larger power supply. The size of the power supply, i.e. the size of the so-called main fuse of the power supply, is a significant cost factor in the building, and in some cases the size of the power supply may be a limiting factor; for example, in existing buildings the supply cable of the building or the transformer supplying electricity for use in the building imposes a maximum limit on the electric power available. Within the building there may also be corresponding limitations. Consequently, it is advantageous to design the elevator system in respect of power supply in a manner such that it will require a low supply power.

SUMMARY

The object of the present invention is to develop the applicability of elevators without counterweight for different purposes and especially their applicability in cases where a building or other assembly contains a plurality of elevators under a common power supply.

The invention purports to accomplish at least one of the following objectives:
  to solve one or more of the above-mentioned problems
  to improve the energy economy of the elevator without counterweight
  to reduce the maximum power needed by the elevators in a building together, thereby reducing the size of the power supply required by the elevators
  to develop an elevator group without counterweight in which the energy consumption and/or power requirement is reasonable in relation to the passenger transport capacity of the elevator group.

The elevator group or set of elevators is discussed below. The method of the invention is also discussed below. Some embodiments of the invention are characterized by what is disclosed in the claims. Inventive embodiments are also presented in the description part and drawings of the present application. The inventive content disclosed in the application can also be defined in other ways than is done in the claims below. The inventive content may also consist of several separate inventions, especially if the invention is considered in the light of explicit or implicit sub-tasks or in respect of advantages or sets of advantages achieved. In this case, some of the attributes contained in the claims below may be superfluous from the point of view of separate inventive concepts. The features and details of different embodiments of the invention can be applied in conjunction with other embodiments.

By applying the invention, it is possible to form from elevators without counterweight an elevator group or a set of elevators that are controlled together in respect of energy and/or power consumption so that the electric mains supply line power, i.e. the common fuse size for the elevator group or set of elevators is considerably smaller than would be the summed supply line power/fuse size for the elevators in the elevator group/set of elevators. According to the invention, the set of elevators without counterweight has a common connection to the electric mains supply, and they primarily utilize energy generated by each other and draw supplementary power from the electric mains via their common connection. The power requirement is limited by regulating the dispatch of elevator cars in the up direction. By preventing cars from being dispatched upwards when more elevator cars are traveling in the up direction than in the down direction, a large load on the power supply is avoided. The prevention or delaying of dispatch of elevator cars may also be applied to down-bound elevator cars. Instead of or besides being based on a consideration of the numbers of down-bound and up-bound elevator cars, the prevention or delay of dispatch may also be based on a consideration wherein the instantaneous or predicted short-time-range power consumption of the elevator group is compared to an allowed power consumption, determined e.g. by a group-specific fuse. In an embodiment of the invention, the elevators have a common control system which contains an instruction to prevent or delay the dispatch of an elevator car having stopped at a floor if at the instant and/or within a set period of time the power consumed from the electric network or fed into the electric network by the set of elevators together exceeds a set value. Instead of preventing or delaying the dispatch of elevator cars, the acceleration of elevator cars on departure can be reduced, so that the final speed of the elevator car is reached more slowly and the power required for the acceleration is also lower. Reduced-acceleration may also be used in connection with the delaying of departure, in which case the control system has a wider margin of operation. The final speed of the elevator car can also be reduced, in which case a reduced power level is obtained for the entire journey. In the invention, the decision regarding the dispatch of elevators or the delay of dispatch may be based on the situation prevailing at the current instant of time in the elevator group or other set of elevators being controlled. However, such a decision is preferably based on information available to the control system at the instant of time regarding the situation prevailing within a given time window. Such a time window preferably shows at least the motional state of elevator cars currently traveling, up to the next stop. Such a time window may be a fixedly set period of time starting from the instant of decision. The time window may also be changeable and set by control, for instance on the basis of the traffic situation or to provide a preview until an instant when the traffic for the particular elevator car is known to or reliably predictable by the control system. The remaining stopping time of stationary elevators is preferably also taken into account. Correspondingly, it is also possible to limit the feedback of power into the mains by limiting simultaneous movement of elevator cars in the down direction. However, limiting the feedback of power into the mains is not such a critical factor in respect of supply power ratings because, instead of being fed back into the mains, the extra power that cannot be utilized for other elevators can be dissipated e.g. by converting it into heat in a brake resistor. The invention is especially well applicable for use in situations of quiet traffic, where the elevators are dispatched at long intervals. By applying the invention, the size of the electric power supply connection common to the elevator group or other set of elevators can easily be halved without any special other measures and without thereby significantly compromising on service level. In some embodiments, it is possible to limit the size of the power supply connection to less than the size corresponding to the total power requirement of two elevators or even to a size designed for the maximum power of only one elevator. One expedient for reducing the total power requirement is to restrict the dispatch of elevator cars in the same direction closely one after the other. In practice, already a very short period, at least about 1 second, e.g. 3 seconds, between dispatches is sufficient. The period could be about the time required for the elevator to accelerate the elevator car, or even less than half this time, or in the case of slow elevators even as long as 2-3 times the length of the acceleration time. The acceleration/deceleration of elevators is typically in the range of 0.8 . . . 1.2 m/s$^2$. This has the effect that the full-speed passages of elevators moving in the same direction occur in a partially overlapping consecutive manner. However, if a situation arises where at least two more elevators are traveling in one direction than in the other direction, then the limitation on consecutive dispatches of elevator cars in this other direction can be temporarily cancelled.

The primary area of application of the invention is elevators intended for transportation of passengers. Buildings provided with several elevators may have separate elevators for passenger transportation and one or more other elevators for freight transportation, or some or all of the elevators are intended for the transportation of both goods and people. The invention can also be applied to elevators used for the transportation of goods. An advantageous application of the invention is an elevator group in which the elevators are controlled by a group control system, but the invention can also be applied to a set of elevators having no other common control than that required by the invention.

A common field of application of the invention is in elevators having a speed range clearly exceeding 1 m/s. Still, the field of application of the invention can be extended to slower elevators as well, even elevators with speeds below 1 m/s. A preferable application is an elevator group in which all the elevators have the same nominal speed, but the invention can also be applied to a different type of set of elevators. The elevator-specific maximum power requirement in such a different set is preferably about the same. For example, a heavier slow elevator is well suited for inclusion in a set where the other elevators are faster and lighter; this is the case e.g. in a set of elevators comprising one freight elevator and a few passenger elevators.

BRIEF DESCRIPTION OF THE DRAWINGS

In the following, the invention will be described in detail with reference to a few embodiment examples and the attached drawings, wherein.

DETAILED DESCRIPTION OF EXAMPLE EMBODIMENTS

Figure 1:
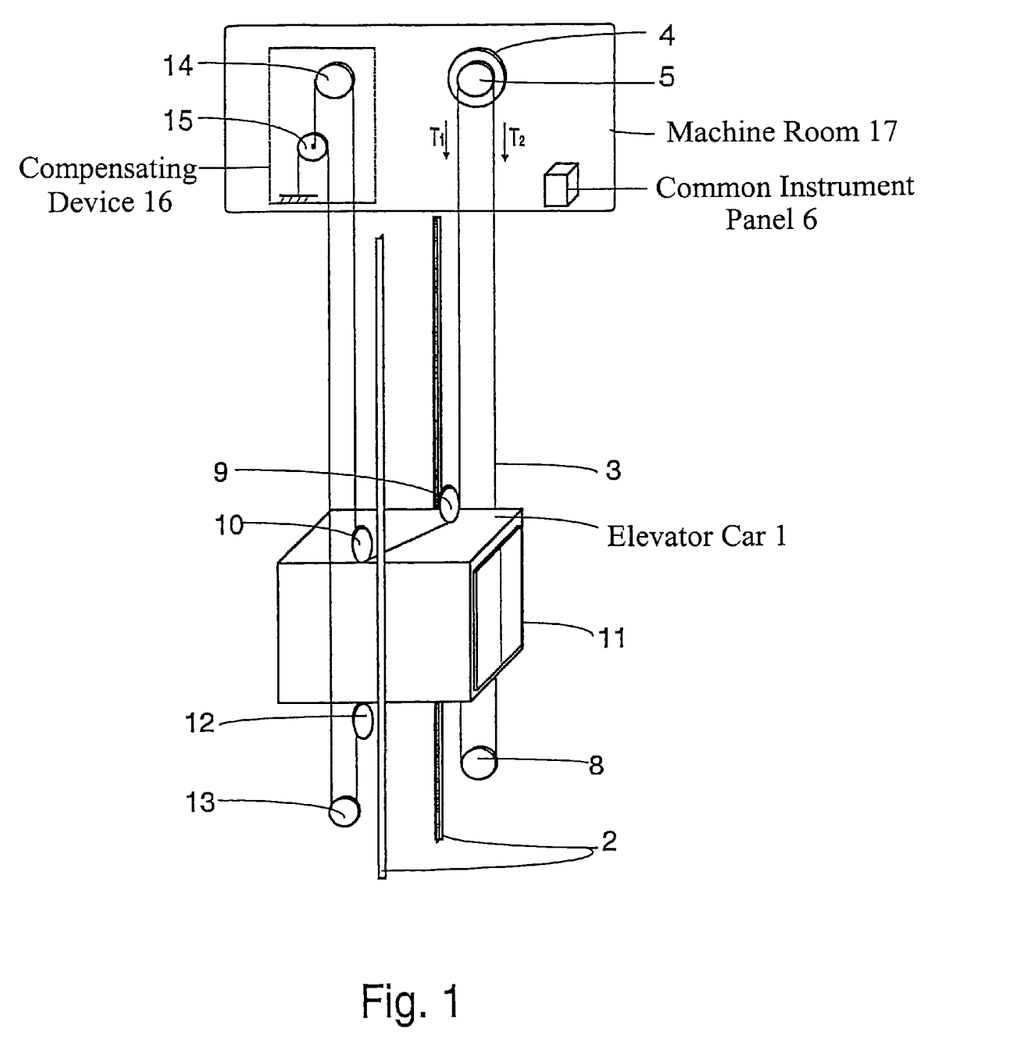
FIG. 1 presents a diagrammatic view of a traction sheave elevator without counterweight.

FIG. 1 is a general representation of a traction sheave elevator without counterweight which is suited for use to apply the invention. The elevator is an elevator with machine room, having a drive machine 4 placed in a machine room 17 above the elevator shaft, which also houses an compensating device 16. The compensating device could also be disposed in some other place, for instance in the upper part of the elevator shaft or in the lower part of the elevator shaft. The elevator presented in the figure is a traction sheave elevator without counterweight, with an elevator car 1 moving along guide rails 2. In elevators with a large hoisting height, the elongation of the hoisting rope involves a need to compensate the rope elongation, which has to be done reliably within certain allowed limit values. It is essential in respect of elevator operation and safety that the rope portion below the elevator car be kept sufficiently tight. In the rope force compensating device 16 presented in FIG. 1, a very long movement is achieved for the compensation of rope elongation. This permits the compensation of even large elongations, which is often not possible by using simple lever or spring solutions. The compensating device 16 produces a constant ratio $T_1/T_2$ between the rope tensions $T_1$ and $T_2$ acting on the traction sheave. In the case illustrated in FIG. 1, the ratio $T_1/T_2$ is about 2/1. The exact value of the ratio of the rope tensions is somewhat dependent on the position of the compensating device, and likewise on the structure of the compensating device, e.g. on the weight of the movable rope pulley 15. With even suspension ratios above and below the elevator car, the compensating device 16 is fitted in the elevator shaft or in some other corresponding appropriate place not in conjunction with the elevator car, and with odd suspension ratios above and below the elevator car the compensating device 16 is fitted in conjunction with the elevator car 1.

In FIG. 1, the hoisting ropes run as follows: One end of the hoisting ropes 3 is fixed to diverting pulley 15 and/or to its possible suspension arrangement. In FIG. 1, diverting pulleys 14 and 15 constitute a compensating device 16. The compensating device 16 is fitted in place in the elevator machine room 17. From the diverting pulley 15, the hoisting ropes 3 go upwards and meet the second diverting pulley 14 of the compensating device, passing around it along rope grooves provided on the diverting pulley 14. The rope grooves of the rope pulleys of the elevator may be coated or uncoated. A preferable material for the coating of the rope groove is a friction-increasing material, such as polyurethane, but the coating of the rope groove may also be selected on other criteria. All the diverting pulleys of the elevator or only some of them and/or the traction sheave may be coated with the material in question. Having passed around diverting pulley 14, the ropes go further downwards into the elevator shaft and further on to a diverting pulley 10 mounted on the elevator car 1, from which the ropes 3 run further to a second diverting pulley 9 mounted on the elevator car. The passage of the hoisting ropes 3 to the other of the elevator shaft is arranged by means of diverting pulleys 10 and 9, the passage of the hoisting ropes over the elevator car 1 being preferably arranged diagonally via the center of mass of the elevator car. Having passed around diverting pulley 9, the rope goes again upwards to the hoisting machine 4 placed in the machine room 17, to its traction sheave 5. Diverting pulleys 14,10,9 together with the traction sheave 5 of the hoisting machine 4 determine the suspension above the elevator car, where the suspension ratio is the same as in the suspension below the elevator car, this suspension ratio being 2:1 in FIG. 1. Acting on the hoisting rope portion above the elevator car is a first rope tension $T_1$. Having passed around the traction sheave 5, the ropes go further to a diverting pulley 8 in the elevator shaft, this diverting pulley 8 being fitted in place in the lower part of the elevator shaft. Having passed around diverting pulley 8, the ropes 3 go further upwards to a diverting pulley 11 fitted in place on the elevator car, this diverting pulley being not visible in FIG. 1. Having passed around diverting pulley 11, the hoisting ropes run further, in a manner corresponding to the suspension above the elevator car, to a diverting pulley 12 placed on the other edge of the elevator car and at the same time the hoisting ropes go to the other side of the elevator shaft. Having passed around diverting pulley 12, the hoisting ropes 3 go further downwards to a diverting pulley 13 placed in the lower part of the elevator shaft, pass around it and return to the elevator machine room 17, to the other diverting pulley 15 of the compensating device 16, and having passed around this diverting pulley 15 the hoisting ropes go further to the anchorage of the second end of the hoisting ropes, which is located at a suitable position in the elevator machine room 17 or in the elevator shaft. Diverting pulleys 8,11,12,13 determine the passage of the hoisting ropes in the suspension below the elevator car. Acting on this portion of the hoisting ropes below the elevator car is a second rope tension $T_2$ of the hoisting rope. The diverting pulleys in the lower part of the elevator shaft may be mounted in place on a frame structure formed by the guide rails 2 or to a beam structure located at the lower end of the elevator shaft or each pulley separately in the lower part of the elevator shaft or on some other mounting arrangement appropriate for the purpose. The diverting pulleys on the elevator car may be mounted in place on the frame structure of the elevator car 1, e.g. on the car frame, or on a beam structure or beam structures in the elevator car or separately on the elevator car or some other appropriate mounting arrangement.

The drive machine 4 is preferably of a flat construction, in other words, the machine has a small thickness dimension as compared to its width and/or height. The machine may also be placed in the elevator shaft, in which case, due to the flat or otherwise compact construction of the machine, it can be easily placed in a space available in the elevator shaft, e.g. between the track of the elevator car and a wall of the elevator shaft. However, application of the invention is not dependent on the type of the machine, but the drive machine 4 used in the elevator without counterweight of the invention may be almost any type and design of machine that fits into the space intended for it. For example, it is possible to use a geared or a gearless machine. The machine may be of compact size and/or flat construction. The elevator machine room is advantageously provided with equipment required for the supply of power to the motor driving the traction sheave 5 as well as equipment needed for elevator control, both of which can be placed in a common instrument panel 6 or else mounted separately from each other or integrated partly or wholly with the drive machine 4. A preferable solution is a gearless machine comprising a permanent magnet motor. FIG. 1 describes a preferable suspension solution wherein the suspension ratio of both the diverting pulleys above the elevator car and the diverting pulleys below the elevator car is the same 2:1 suspension. The suspension above the elevator car 1 is implemented by means of diverting pulleys 14,10,9 and the traction sheave 5, and the suspension below the elevator car 1 is implemented by means of diverting pulleys 13,12,11,8. Other suspension solutions can also be used to implement the invention. Small suspension ratios, e.g. 1:1 and 2:1, are suitable for high speeds, whereas large suspension ratios, e.g. 6:1 and 8:1, are suitable for lower speeds. A suspension ratio of 2:1 can quite well be used to implement an elevator for a speed of e.g. 3.5 m/s, 4 m/s or 6 m/s. A preferable range of application for elevators with a 2:1 suspension ratio are elevators intended for a speed of over 4 m/s. The suspension ratios of elevators in the speed range of 1 m/s . . . 2 m/s are preferably selected between 4:1 . . . 10:1. An advantageous example of an elevator with a 2:1 suspension ratio as presented in FIG. 1 is an elevator which has a speed of about 6 m/s and a total mass of car an nominal load of about 4000 kg and in which the hoisting ropes consist of six elevator ropes having a diameter of about 13 mm.

Figure 2:
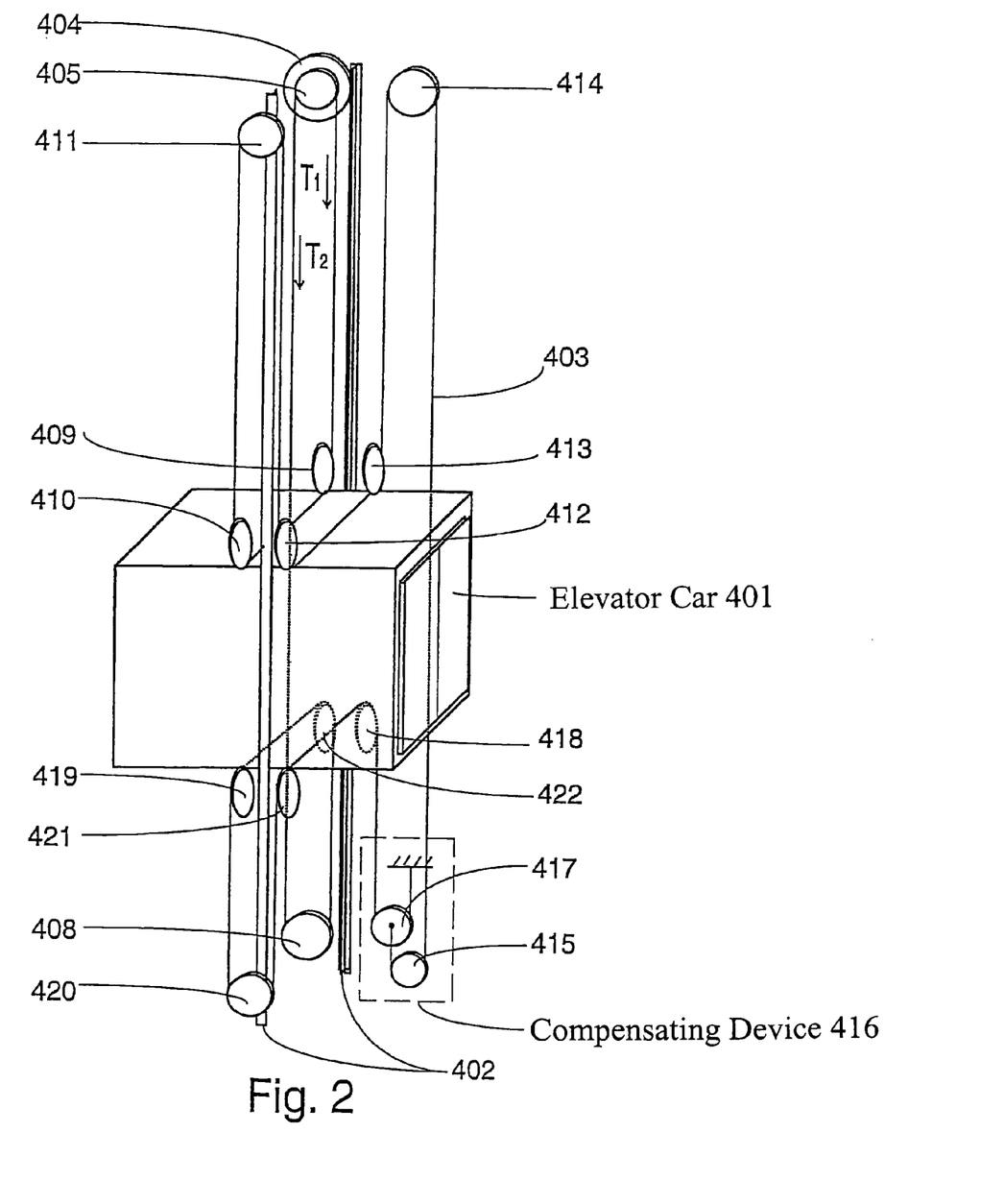
FIG. 2 presents a diagrammatic view of another traction sheave elevator without counterweight.

FIG. 2 presents a diagram of a second elevator without counterweight. This is an elevator without machine room, whose drive machine 404 and compensating gear are placed in the elevator shaft. The elevator car 401 moves along guide rails 402. The compensating device 416 is fitted in place in the lower part of the elevator shaft. The compensating device 416 in FIG. 2 is a gravity-assisted device, to which it is possible to add additional weights if necessary to improve the operation of the compensating device. Arranged in the compensating device 416 is a auxiliary force that acts substantially in the same direction with the first rope tension ($T_1$). The auxiliary force increases the second rope tension $T_2$ in relation to the first rope tension $T_1$.

In FIG. 2, the hoisting ropes run as follows: One end of the hoisting ropes 403 is fixed to a diverting pulley 417 or its possible suspension arrangement, this diverting pulley 417 being fitted to hang on a rope portion coming downwards from diverting pulley 418, which hoisting rope portion passes around diverting pulley 417 and goes further to the anchorage of the second end of the hoisting rope 403 in the elevator shaft. A compensating device 416 is fitted in place in the elevator shaft. From diverting pulley 415, the hoisting ropes 403 go upwards and meet a diverting pulley 414 fitted in place in the upper part of the elevator shaft, passing around it along rope grooves provided on the diverting pulley 414. Having passed around diverting pulley 414, the ropes go further downwards to a diverting pulley 413 mounted on the elevator car 401, and having passed around this pulley the ropes 403 run further across the elevator car 401 to a second diverting pulley 412 mounted on the elevator car. From diverting pulley 412, the ropes go further upwards to a diverting pulley 411 fitted in place in the upper part of the elevator shaft, pass around it and return to a diverting pulley 410 mounted on the elevator car, from which they run further across the elevator car to a diverting pulley 409 on the elevator car and at the same time to the other edge of the elevator shaft. From diverting pulley 409, the hoisting ropes go further upwards to the traction sheave 405 of the hoisting machine 404, which is placed in the upper part of the elevator shaft. The hoisting rope portion above the elevator car is subject to a first rope tension $T_1$. Having passed around the traction sheave 405, the ropes run further to a diverting pulley 408 fitted in place in the lower part of the elevator shaft. ($T_1$) From diverting pulley 408, the ropes 403 go further upwards to a diverting pulley 422 mounted on the elevator car. Having passed around diverting pulley 422, the hoisting ropes run further in a manner similar to the roping above the elevator car 401, under the elevator car 401 to a diverting pulley 419 placed on the other edge of the elevator car, and at the same time the line of passage of the hoisting ropes 403 is shifted to the other edge of the elevator shaft. From diverting pulley 419, the hoisting ropes go further downwards to a diverting pulley 420 in the lower part of the elevator shaft, and having passed around it they go back to the elevator car 401 and to a diverting pulley 421 mounted on it, from which the hoisting ropes run further under the elevator car to a diverting pulley 418 placed on the other edge of the elevator car, and at the same time the line of passage of the hoisting ropes 403 is shifted back to the other edge of the elevator shaft. From diverting pulley 418, the hoisting rope goes further to the second diverting pulley 417 of the compensating device 416 and from diverting pulley 417 further to the anchorage of the second end of the hoisting ropes, which is located in a suitable place in the elevator shaft. This hoisting rope portion below the elevator car is subject to a second rope tension $T_2$ of the hoisting rope. The rated speed of such an elevator with 4:1 suspension is suitably in the range of 1.6 m/s . . . 4 m/s, e.g. 2.5 m/s.

Figure 3:
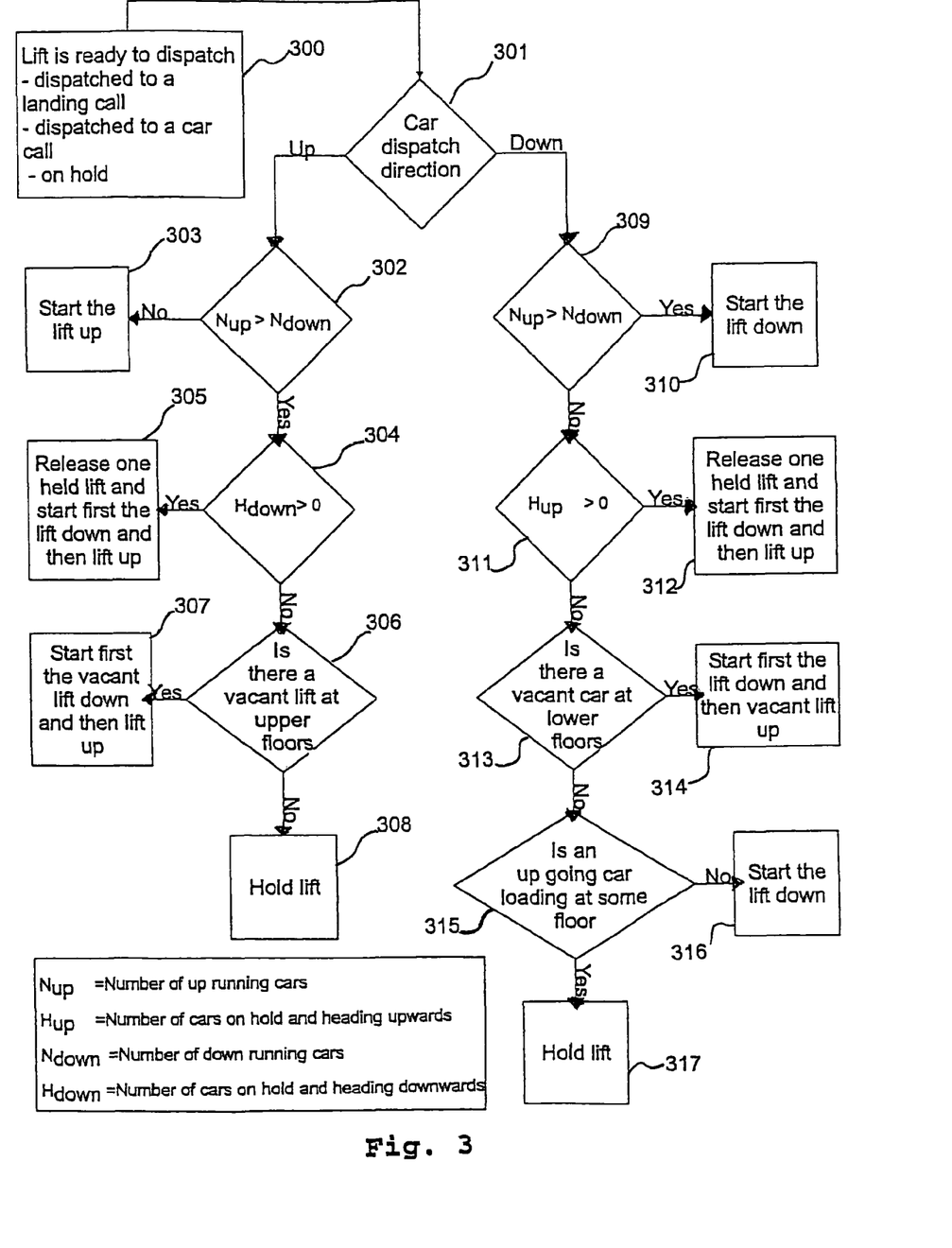
FIG. 3 presents a block diagram of a method according to the invention for controlling the operation of an elevator group.

FIG. 3 visualizes a method according to the invention for controlling the operation of an elevator group consisting of elevators without counterweight so as to limit the power consumption in the elevator group. In the elevator group, elevators moving in the up direction take electric power and elevators moving in the down direction release electric power. The power released by the elevators moving downwards is available to the other elevators. The intake and release of electric power occur at certain rates of efficiency, so that at least losses have to be compensated for by energy taken from outside the system. The power of such energy intake from outside is preferably limited to about the power required for upward travel of one elevator plus the power required for maintaining other functions of the elevator system. Such other functions include illumination and control functions. FIG. 3 presents a chain of inferences which implements the invention and according to which the group control system controls the dispatch of an elevator belonging to the group in the following manner. In the initial situation 300 with the elevator car ready to be dispatched, either on the basis of a car call or a floor call, or held stationary awaiting dispatch, the system checks 301 whether the elevator car is to be dispatched in the upward or the downward direction. If the dispatch direction is up, then a check 302 is made to see whether the number $N_{up}$ of elevator cars moving upwards in the elevator group is larger than the number $N_{down}$ of elevator cars moving downwards, and if this is not the case, then the elevator car is dispatched in the up direction 303. When the number of elevator cars moving upwards is larger than the number of elevator cars moving downwards, a check 304 is carried out to establish whether at the current instant there are elevator cars ready to be dispatched which have a down call but which have not been dispatched, in other words, the system checks whether the number $H_{down}$ of elevators heading downward but held stationary differs from zero. If at that instant there is an elevator car heading downward but not dispatched, then this car is dispatched and after that an elevator car 305 heading upward is dispatched. If at that instant there is no elevator car ready to be dispatched that has a down call, then a check 306 is made to see whether a vacant elevator car is available at the upper floors, and if such a vacant elevator car is available then it is first dispatched downwards and after that an elevator car heading upwards is dispatched 307. If no vacant elevator car is available, then the upward dispatch 308 of an elevator car is delayed. At this point, the cycle of inference reaches the initial situation 300 again. If in the initial situation 300 the dispatch direction of the elevator car is down, then a check 309 is made to see whether the number of elevator cars moving upwards in the elevator group is larger than the number of elevator cars moving downwards, and if this is the case, then the elevator car is dispatched in the down direction 310. If the number of elevator cars moving upwards in not larger than the number of elevator cars moving downwards, then the system checks 311 whether there are at that instant any elevator cars ready to be dispatched which have an up call but which have not been dispatched, in other words, whether the number $H_{up}$ of elevators to be dispatched upwards but held stationary differs from zero. If at that instant there is an elevator car heading upward but not dispatched, then first a car heading downward is dispatched and after that the elevator car heading upward is dispatched 312. If at that instant there is no elevator car ready to be dispatched that has an up call, then a check 313 is made to see whether a vacant elevator car is available at the lower floors, and if such a vacant elevator car is available then the elevator car heading downward is first dispatched and after that the vacant elevator car is dispatched upwards 314. If no vacant elevator car is available at the instant, then a check 315 is carried out to see whether there is in the elevator group an elevator car heading upwards that is being held stationary to let passengers embark or disembark. If no elevator car heading upwards is standing at a floor, then an elevator car is dispatched 316, but if an elevator car heading upwards is standing still to let passengers embark or disembark, then the dispatch of the elevator car in the downward direction 317 is delayed. At this point, the cycle of inference reaches the initial situation 300 again. Via this procedure, it is possible in the elevator group to limit the power it needs from the electric power supply and, on the other hand, to utilize the energy released by elevator cars moving downwards for the upward movement of elevator cars going upwards.

Figure 4A:
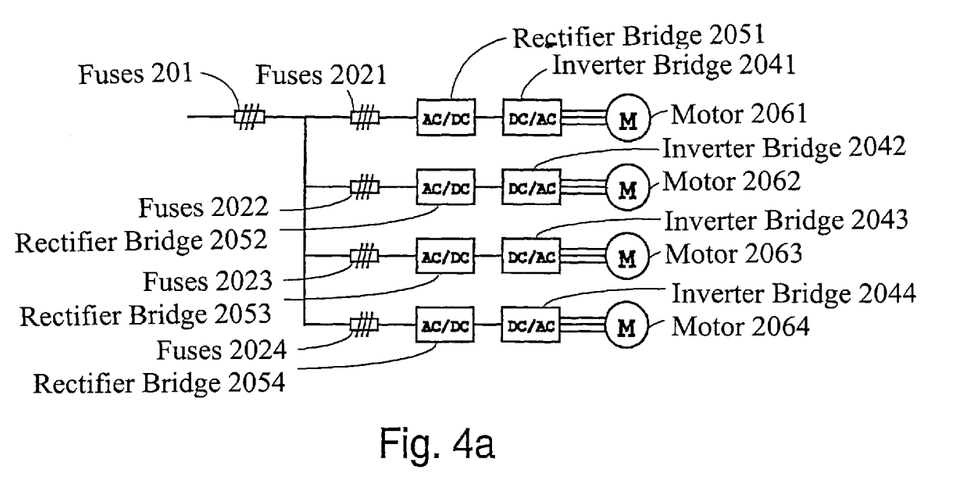
FIG. 4a presents a diagram representing an arrangement for implementing the supply of power to an elevator group applying the invention.

FIG. 4a illustrates an arrangement for implementing the supply of electric power to an elevator group applying the invention. The elevator group is connected to a common power supply. The power supply is protected by fuses 201. The mains supply is further branched off into lines to be used by the elevators, each line being protected by elevator-specific fuses 2021, 2022, 2023, 2024. The motor 2061, 2062, 2063, 2064 of the drive machine of each elevator is driven by a frequency converter comprising a rectifier bridge 2051, 2052, 2053, 2054 and an inverter bridge 2041, 2042, 2043, 2044 and between these a DC intermediate circuit. As the elevators have no counterweight, driving the elevator upwards means that energy is supplied via the frequency converter and hoisting machine and converted into mechanical potential energy of the elevator car and its load with a power proportional to the velocity of the elevator car. Correspondingly, when the elevator car is being driven downwards, the potential energy of the elevator car and its load is released in the reverse direction via the motor and the frequency converter. The times of dispatch of elevators heading upwards and downwards are mutually adapted so as to make the energy released by the elevators moving downwards available for consumption by the elevators moving upwards, thus maintaining a low level of power taken from and/or returned to the mains network via the common power supply.

Figure 4B:
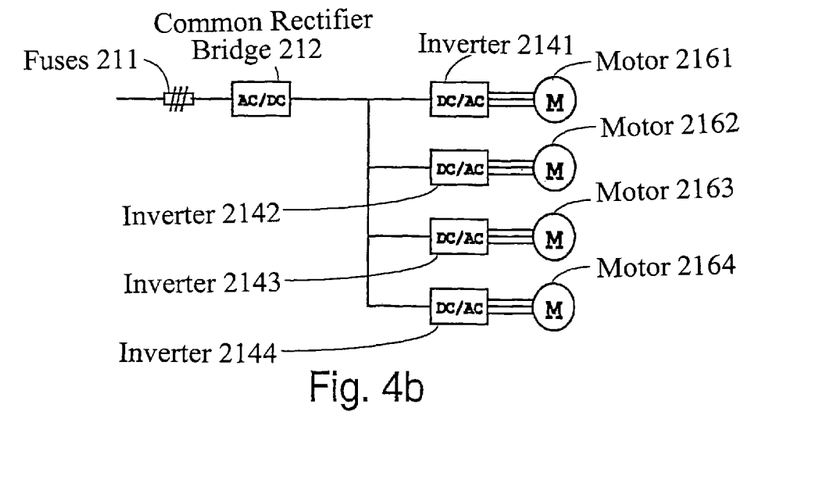
FIG. 4b presents a diagram representing another arrangement for implementing the supply of power to an elevator group applying the invention.

FIG. 4b illustrates a second arrangement for implementing the supply of electric power to an elevator group. The power supply is protected by fuses 211. The electric drives of the elevators in the elevator group have a common rectifier bridge 212 and thus also a common DC intermediate circuit or DC bus, from which the inverters 2141, 2142, 2143, 2144 take power when driving the elevator cars upwards by means of the respective motors 2161, 2162, 2163, 2164, and to which they release power when driving the elevator cars downwards. By sharing the power released by downward traveling elevators in the intermediate circuit for consumption by elevators needing power, the efficiency of the system is improved due to the smaller number of rectification and inversion actions, the amount of energy needed from the mains being thus reduced.

Figure 5:
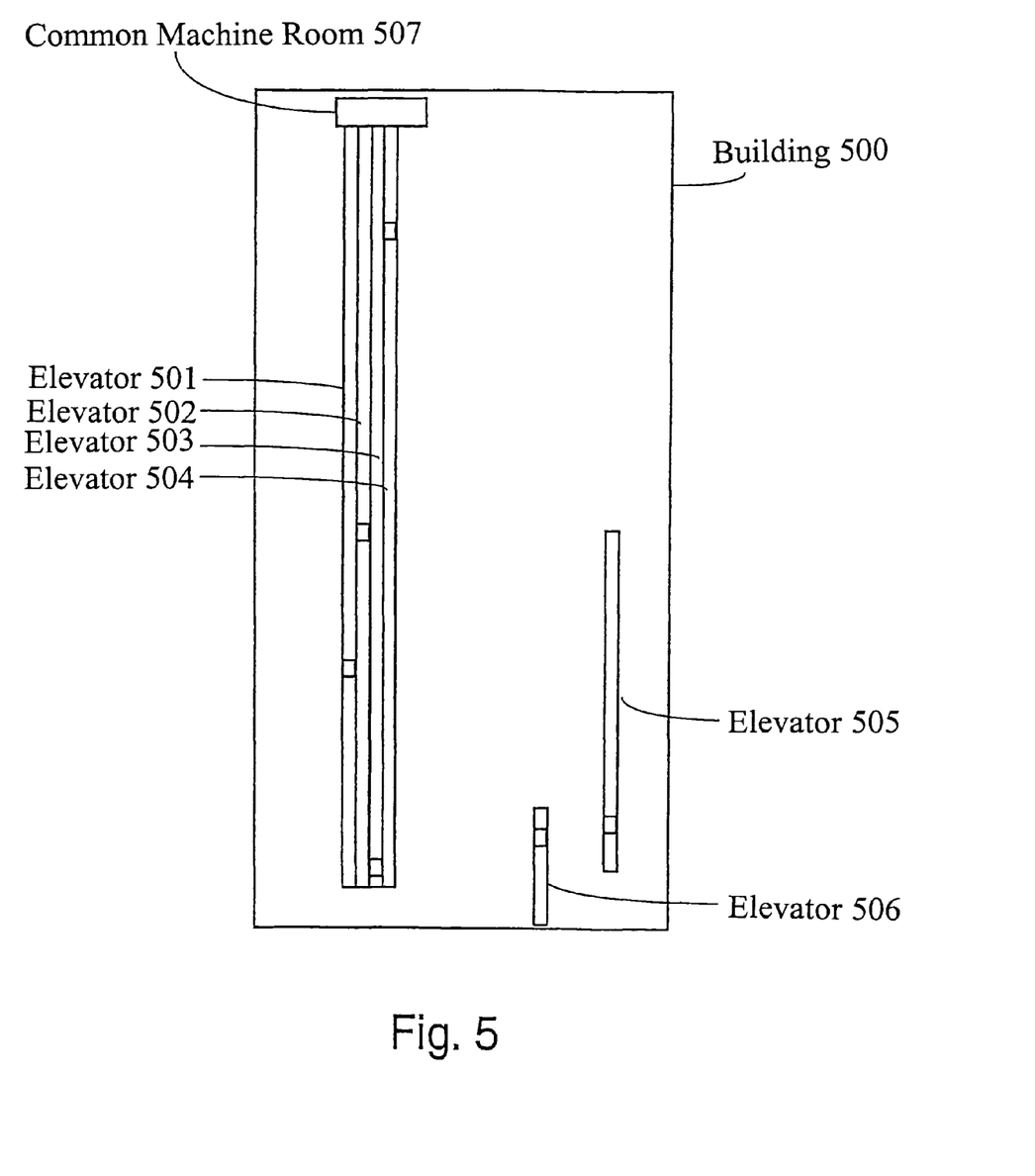
FIG. 5 presents a diagrammatic view of a building in which the invention is applied.

FIG. 5 presents a building 500 where the invention is applied, with elevators 501,502,503,504,505,506. Four of the elevators, viz. elevators 501,502,503,504, are arranged as an elevator group with a common machine room 507 for the elevators in the group. The two other elevators 505 and 506 are separate from the group. The elevators of the elevator group are allocated for the needs of passenger traffic using a special group control system, which optimizes elevator traffic on the basis of smoothness of passenger traffic and/or waiting times and/or maximization of transportation capacity and/or other criteria. According to the invention, the control by the group control system keeps the numbers of elevator cars moving upwards and elevator cars moving downwards in balance within certain limits. This control may be integrated in the group control system or implemented using a separate controller. It is also possible to arrange the separate elevators 505 and 506 in a suitable manner under a common mains supply with the elevator group and connect these elevators under the control system according to the invention.

Figure 6:
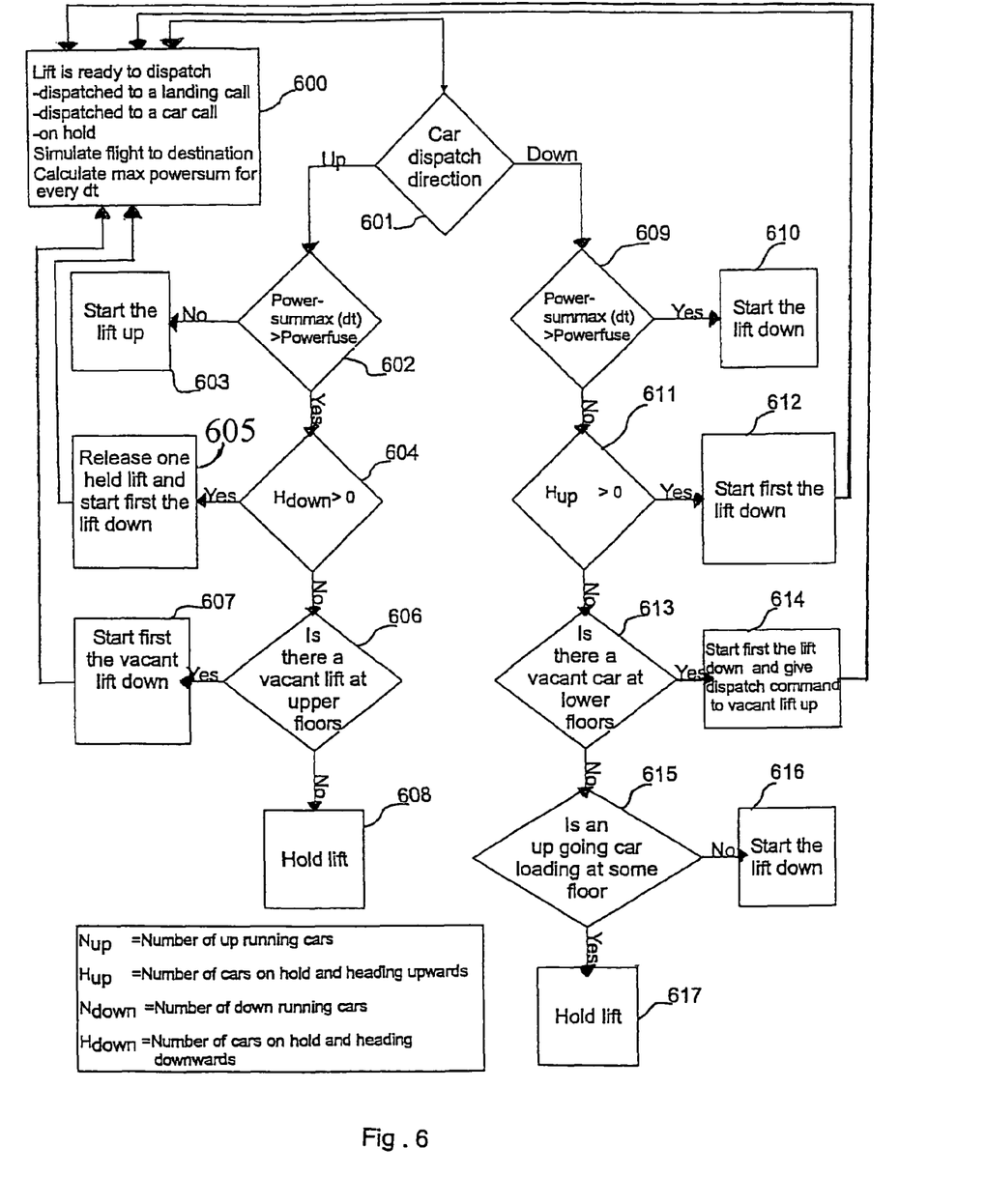
FIG. 6 presents a block diagram of a method according to the invention for controlling the operation of an elevator group.

FIG. 6 visualizes a method according to the invention for controlling the operation of an elevator group consisting of elevators without counterweight so as to limit the power consumption in the elevator group. In the elevator group, elevators moving in the up direction take electric power and elevators moving in the down direction release electric power. The power released by the elevators moving downwards is available to the other elevators. The intake and release of electric power occur at certain rates of efficiency, so that at least losses have to be compensated for by energy taken from outside the system. The power of such energy intake from outside is preferably limited to about the power required for upward travel of one elevator plus the power required for maintaining other functions of the elevator system. Such other functions include illumination and control functions. FIG. 6 presents a chain of inferences which implements the invention and according to which the group control system controls the dispatch of an elevator belonging to the group in the following manner. In the initial situation 600 with the elevator car ready to be dispatched, on the basis of either a car call or a floor call, or held stationary awaiting dispatch, the system checks 601 whether the elevator car is to be dispatched in the upward or the downward direction. If the dispatch direction is up, then a check 602 is made to see whether the maximum power consumption Powersummax of the elevator group in a short time range dt is greater than the size Powerfuse of the main fuse of the elevator group, and if this is not the case, then the elevator car is dispatched in the up direction 603. The short-time-range period considered is the allowed peak duration for the group fuse, e.g., 1-2 seconds, or the acceleration time of the departing elevator or a set fixed time or some other period of suitably selected length. When the maximum power consumption Powersummax of the elevator group in the short time range dt is greater than the size Powerfuse of the main fuse of the elevator group, a check 604 is carried out to establish whether at the current instant there are elevator cars ready to be dispatched which have a down call but which have not been dispatched, in other words, the system checks whether the number $H_{down}$ of elevators heading downward but held stationary differs from zero. If at that instant there is an elevator car heading downward but not dispatched, then this car is dispatched 605, and after that the procedure returns to the initial situation 600 to consider the dispatch of an up-bound elevator car. If at that instant there is no elevator car ready to be dispatched that has a down call, then a check 606 is made to see whether a vacant elevator car is available at the upper floors, and if such a vacant elevator car is available then it is first dispatched 607 downwards and after that the procedure returns to the initial situation 600 to consider the situation regarding the elevator car heading upwards. If no vacant elevator car is available, then the upward dispatch 608 of the elevator car is delayed. At this point, the cycle of inference reaches the initial situation 600 again. If in the initial situation 600 the dispatch direction of the elevator car is down, then a check 609 is made to see whether the maximum power consumption Powersummax of the elevator group in a short time range dt is greater than the size Powerfuse of the main fuse of the elevator group, and if this is the case, then the elevator car is dispatched in the down direction 610. When the maximum power consumption Powersummax of the elevator group in the short time range dt is lower than the size Powerfuse of the main fuse of the elevator group, a check 611 is carried out to establish whether at the current instant there are elevator cars ready to be dispatched which have an up call but which have not been dispatched, in other words, the system checks whether the number $H_{up}$ of up-bound elevators held stationary differs from zero. If at that instant there is an elevator car heading upward but not dispatched, then the down-bound elevator is dispatched 612 first, whereupon the procedure returns to the initial situation 600 to consider the dispatch of the up-bound elevator car. If at that instant there is no elevator car ready to be dispatched that has an up call, then a check 613 is made to see whether a vacant elevator car is available at the lower floors, and if such a vacant elevator car is available then the elevator car is first dispatched 614 downwards and after that the vacant elevator is given a command to depart in the up direction, whereupon the procedure returns to a consideration of the initial situation 600. If there is no vacant elevator car at the lower floors available to be dispatched upwards, then a check 615 is made to see whether there is another up-bound elevator car being loaded at any floor, and if there is, then the elevator car is dispatched downwards 616. If no such other elevator car is available, then the downward dispatch of the elevator car is delayed 617.

It is also obvious to the skilled person that the equipment required for the supply of power to the motor and the equipment required for elevator control can be disposed in other ways than in conjunction with the machine unit, for example in a separate instrument panel, or equipment needed for control may be implemented as separate units, which can be disposed in different places in the elevator shaft and/or in other parts of the building.

It is further obvious to the skilled person that the invention can also be utilized in a different type of set of elevators than an elevator group. The control ensuring that elevator cars are not dispatched upwards if at the instant more elevator cars in the set are moving upwards than downwards may be very robust. For example, in a residential building having a few elevators otherwise separate from each other in respect of control, the upward dispatch of elevators can be regulated by the method of the invention without causing significant changes in waiting times.

The skilled person understands that in a building the invention can be applied only to some of the elevators of the building. Likewise, the skilled person understands that not all of the elevators in the group or set of elevators applying the invention need be identical, and that not all of these elevators necessarily have to be elevators without counterweight.

The skilled person understands that elevator operation also requires other power consumption than the consumption needed for moving the elevator car. This power consumption has some effect on the rating of the electric power supply, but it has not been particularly taken into account in the considerations relating to the invention. However, this other power consumption may be receiving electric power produced from the downward movement of the elevator cars in the elevator system.

The invention claimed is:
1. A set of elevators, comprising:
a plurality of elevators without counterweight;
a power supply; and
a common control system;
wherein the plurality of elevators has a common connection to the power supply, and
wherein the common control system includes one or more instructions to prevent dispatch of an elevator car stopped at a floor if, at that instant, within a set period of time, or at that instant and within the set period of time, power consumed from an associated electrical network by the set of elevators or fed into the associated electrical network by the set of elevators together exceeds a set value.

2. A method for controlling a set of elevators, the set of elevators including a plurality of elevators without counterweight connected to a common power supply, the method comprising:
determining whether at that instant, within a set period of time, or at that instant and within the set period of time, power consumed from an associated electrical network by the set of elevators or fed into the associated electrical network by the set of elevators, together exceeds a set value; and
preventing departure of a next elevator car to be dispatched when the power consumed from the associated electrical network by the set of elevators or fed into the associated electrical network by the set of elevators together exceeds the set value.

3. The set of elevators of claim 1, wherein the plurality of elevators includes at least three elevators.

4. The set of elevators of claim 1, wherein the set of elevators is operated as an elevator group.

5. The set of elevators of claim 1, wherein the common control system further includes one or more instructions to delay dispatch of the elevator car stopped at the floor if, at that instant, within a set period of time, or at that instant and within the set period of time, power consumed from the associated electrical network by the set of elevators or fed into the associated electrical network by the set of elevators, together exceed the set value.

6. The set of elevators of claim 1, wherein the common control system further includes one or more instructions to dispatch, at reduced speed, the elevator car stopped at the floor if, at that instant, within a set period of time, or at that instant and within the set period of time, power consumed from the associated electrical network by the set of elevators or fed into the associated electrical network by the set of elevators, together exceed the set value.

7. The set of elevators of claim 1, wherein the common control system further includes one or more instructions to dispatch, at reduced acceleration, the elevator car stopped at the floor if, at that instant, within a set period of time, or at that instant and within the set period of time, power consumed from the associated electrical network by the set of elevators or fed into the associated electrical network by the set of elevators, together exceed the set value.

8. The set of elevators of claim 1, wherein the set value is determined according to a rating of main fuses of the set of elevators.

9. The method of claim 2, wherein the set value is determined according to a rating of main fuses of the set of elevators.

10. A set of elevators, comprising:
a plurality of elevators without counterweight;
a power supply; and
a common control system;
wherein the plurality of elevators has a common connection to the power supply, and
wherein the common control system includes one or more instructions to delay dispatch of an elevator car stopped at a floor if, at that instant, within a set period of time, or at that instant and within the set period of time, power consumed from an associated electrical network by the set of elevators or fed into the associated electrical network by the set of elevators together exceeds a set value.

11. The set of elevators of claim 10, wherein the plurality of elevators includes at least three elevators.

12. The set of elevators of claim 10, wherein the set of elevators is operated as an elevator group.

13. The set of elevators of claim 10, wherein the common control system further includes one or more instructions to dispatch, at reduced speed, the elevator car stopped at the floor if, at that instant, within a set period of time, or at that instant and within the set period of time, power consumed from the associated electrical network by the set of elevators or fed into the associated electrical network by the set of elevators, together exceed the set value.

14. The set of elevators of claim 10, wherein the common control system further includes one or more instructions to dispatch, at reduced acceleration, the elevator car stopped at the floor if, at that instant, within a set period of time, or at that instant and within the set period of time, power consumed from the associated electrical network by the set of elevators or fed into the associated electrical network by the set of elevators, together exceed the set value.

15. The set of elevators of claim 10, wherein the set value is determined according to a rating of main fuses of the set of elevators.

16. A method for controlling a set of elevators, the set of elevators including a plurality of elevators without counterweight connected to a common power supply, the method comprising:

determining whether at that instant, within a set period of time, or at that instant and within the set period of time, power consumed from an associated electrical network by the set of elevators or fed into the associated electrical network by the set of elevators, together exceeds a set value; and delaying departure of a next elevator car to be dispatched when the power consumed from the associated electrical network by the set of elevators or fed into the associated electrical network by the set of elevators together exceeds the set value.

17. The method of claim 16, wherein when the next elevator car to be dispatched departs, the speed of the elevator car is limited to less than full speed, the acceleration of the elevator car is limited to less than full acceleration, or the speed of the elevator car is limited to less than full speed and the acceleration of the elevator car is limited to less than full acceleration.

18. The method of claim 16, wherein when the next elevator car to be dispatched departs, the speed of the elevator car is limited to less than full speed.

19. The method of claim 16, wherein when the next elevator car to be dispatched departs, the acceleration of the elevator car is limited to less than full acceleration.

20. The method of claim 16, wherein the set value is determined according to a rating of main fuses of the set of elevators.

* * * * *